Dec. 8, 1953     I. L. COOK     2,661,536
NONANATOMIC POSTERIOR DENTURE TEETH
Filed March 26, 1952
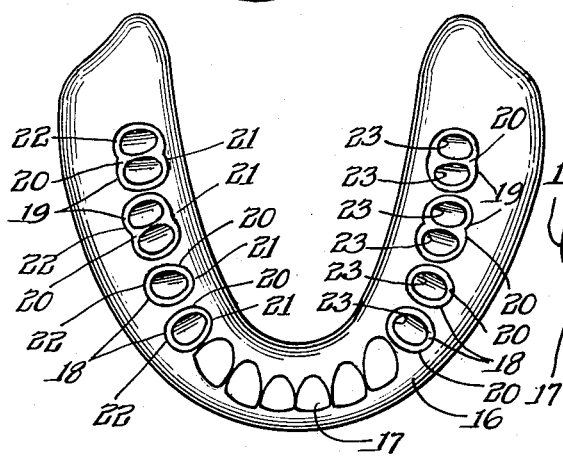
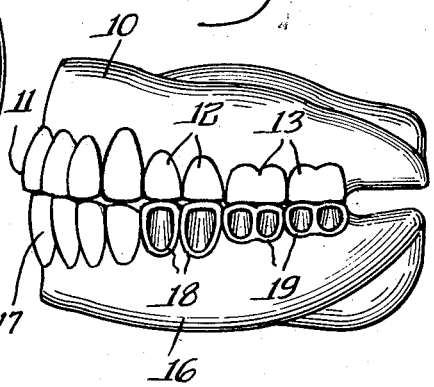
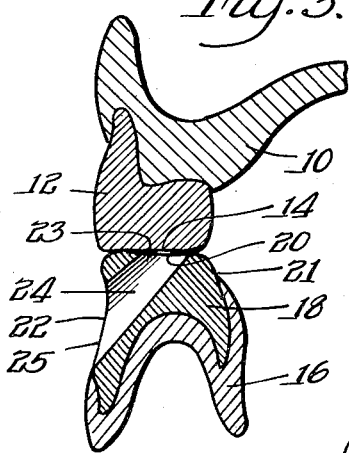
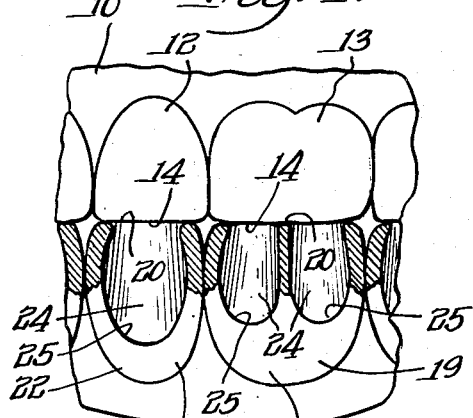
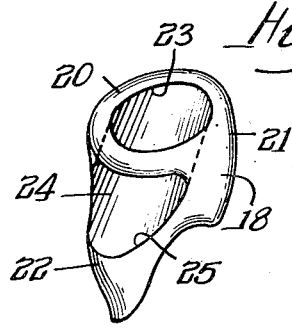
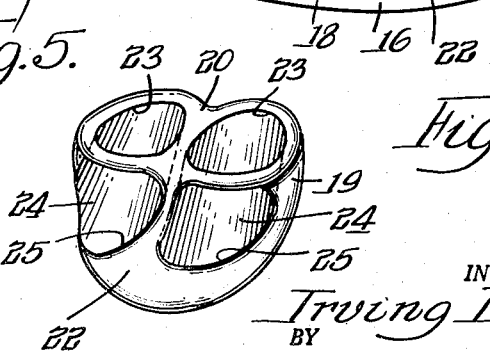
INVENTOR.
Irving L. Cook
BY
Wallenstein & Spangenberg
attys.

Patented Dec. 8, 1953

2,661,536

UNITED STATES PATENT OFFICE 2,661,536

NONANATOMIC POSTERIOR DENTURE TEETH

Irving L. Cook, Suring, Wis.

Application March 26, 1952, Serial No. 278,715

7 Claims. (Cl. 32—2)

This invention relates to nonanatomic posterior teeth for dentures.

In the past considerable research and development work has been done on nonanatomic posterior denture teeth with particular reference to the occlusal surfaces of the teeth. Numerous nonanatomic designs for the occlusal surfaces have been devised and the basis for the particular designs is to provide, for greater ease of mastication, the best possible means of shearing or crushing food with the least trauma to the underlying tissues. Some of these designs only take into consideration the crushing and shearing of the food, others take into consideration the non-interference of cusps to prevent locking and displacement of the dentures, and others attempt to provide nonanatomic teeth that will compensate for loss of vertical dimension by use of a flat plane of occlusion, thereby allowing protrusion of the mandible without interference in the apposition of the occluding teeth in that plane. All of these nonanatomic teeth are designed with escape gates, grooves, channels, sluices and the like on their occlusal faces to allow the food to squeeze out between the occluding teeth of the dentures for the purpose of reducing or easing the pressure that is necessary to bring the teeth together.

However, these nonanatomic teeth heretofore devised and having these occlusal surface designs have not proven particularly satisfactory. It has been difficult to align and fit properly the occluding surfaces of the denture teeth. As time goes on the occlusal surfaces of the teeth become worn down and the escape gates, grooves, channels, sluices and the like formed in the occlusal surfaces become more shallow until the occlusal surfaces are flat requiring increasing pressures to force the teeth through the food with resultant trauma to the underlying tissues. In these various prior designs the food is primarily crushed by the occlusal surfaces of the denture teeth, requiring relatively great masticating pressures.

The principal object of this invention is to provide improved nonanatomic posterior teeth for dentures wherein the foregoing shortcomings of the prior tooth designs are circumvented, wherein the occluding surfaces of the teeth may be readily and automatically aligned and balanced, wherein wear over periods of years has substantially no effect upon the masticating efficiency of the teeth nor the pressures required for mastication, and wherein the food is primarily cut into small and easily digestible and assimilated particles rather than being crushed, thereby greatly decreasing mastication pressures.

The nonanatomic posterior teeth of this invention are preferably carried in the lower denture and they are preferably made of metal such as gold or the like, although they may be made of other materials such as porcelain, plastic or the like. Their occlusal faces are preferably substantially smooth and complementary to the occlusal faces of nonanatomic teeth of the upper denture, which are also preferably substantially smooth. The contours of the substantially smooth occlusal faces of the teeth may be of any desired shape such as substantially flat, convex, concave or the like. While the teeth of the upper denture may be made of any desired material, they are preferably made of porcelain or the like to cooperate with the metal teeth of the lower denture, the abrasive action of the harder porcelain upper teeth causing the softer metal lower teeth to wear in exactly in accordance with the upper teeth and likewise in accordance with movements, pressure and excursions of the lower jaw, thereby eliminating any mechanical interference which would tend to dislodge the dentures. In other words, interference free dentures are automatically produced by the wearer through natural abrasion of the teeth of this invention.

Each nonanatomic posterior tooth of the lower denture has at least one opening in the substantially smooth occlusal face thereof adjacent the center thereof and a substantially straight tunnel connecting said opening in the occlusal face with an opening in one of the side faces of the tooth, preferably the buccal face. The smaller posterior teeth each preferably have a single opening and tunnel while the larger posterior teeth each preferably have a pair of such openings and tunnels. The walls of the tunnels preferably uniformly diverge from the openings in the occlusal faces to the openings in the side faces of the teeth. These openings in the occlusal faces and the tunnels extending therefrom form escape paths for food down through the occlusal surfaces and out through the side or buccal surfaces of the teeth, rather than sole escape from between the occluding teeth as in the prior constructions. Of course, some food will escape from between the occluding teeth of this invention but the vast majority of it will escape through the tunnels.

The denture teeth of this invention, because of the central openings in the occlusal faces thereof and the communicating tunnels, cut the food in small particles, according to the size of the occlusal openings, rather than crushing the food as in the prior constructions. The fact that the teeth of this invention cut the food instead of crushing the same requires less masticating pressure to obtain the desired end result of having the food in fine particles which are readily digestible and assimilated. Because of the smaller masticating pressure required by the teeth of this invention trauma and abuse to the underlying supporting structures and tissues is minimized to a greater degree than with prior designs of denture teeth. Since the walls of the tunnels diverge from the openings in the occlusal faces to the openings in the side or buccal faces, food entering the occlusal openings freely passes through the tunnels, the tunnels therefore being self-eliminating and cleaning. Because the tunnels are also substantially straight and open directly into the occlusal and buccal faces, they may also be readily and simply brushed and cleaned.

With the wearing or abrasion of the occlusal surfaces of the teeth of this invention, no efficiency in cutting of the food is lost because as the occlusal faces wear down, the same cutting edge remains throughout the years and the escape tunnels for the food remain intact and just as efficient as at the time of original insertion of the dentures. In the prior tooth constructions masticating efficiency decreases with wear, but with the teeth of this invention there is no loss in efficiency. In fact, the efficiency of the teeth of this invention increases with wear because the abrasive action of the upper porcelain teeth against the lower metal teeth causes the latter to wear in exactly in accordance with the upper teeth and sharpens the cutting edges at the occlusal openings.

Further objects of this invention reside in the details of construction of the dentures and nonanatomic teeth and in the cooperative relationships between the component parts thereof.

Other objects and advantages of this invention will become apparent to those skilled in the art upon reference to the accompanying specification, claims and drawing, in which:

Fig. 1 is a top plan view of the lower denture embodying the nonanatomic posterior teeth of this invention;

Fig. 2 is a side elevational view illustrating the cooperative relationship between the upper and lower dentures;

Fig. 3 is an enlarged vertical sectional view through the upper and lower dentures, including the nonanatomic teeth thereof;

Fig. 4 is an enlarged side elevational view of portions of the upper and lower dentures, partly in section;

Fig. 5 is a perspective view of one of the smaller posterior denture teeth of this invention; and Fig. 6 is a perspective view of one of the larger posterior denture teeth of this invention.

Referring now to the drawing, an upper denture, preferably made of plastic or other suitable material, is designated at 10. A plurality of anterior teeth 11 and a plurality of posterior teeth 12 and 13 are suitably carried by the upper denture 10 as by molding the same in the denture as it is formed. These teeth 11, 12 and 13 are preferably made of porcelain, although they may be made of other materials such as plastic or the like. The posterior teeth 12 are smaller than the posterior teeth 13. The posterior teeth 12 and 13 have substantially smooth occlusal surfaces 14. These surfaces, while being substantially smooth, may have any desired configuration, such as substantially flat, convex, concave or the like.

A lower denture 16 may be made of any suitable material, such as plastic or the like. This lower denture 16 suitably carries anterior teeth 17 and posterior teeth 18 and 19, as by molding the same in the denture as the latter is being formed. The anterior teeth 17 may be made of the same material as the teeth of the upper denture. The posterior teeth 18 and 19 may be made of any suitable material, such as porcelain, plastic or the like but, preferably, are made of a relatively soft metal such as gold, silver or the like, which will not tarnish or corrode and which will take a high polish. These posterior teeth 18 and 19 have occlusal surfaces 20 which are complementary and engageable by the occlusal surfaces 14 of the upper posterior teeth 12 and 13. These posterior teeth 18 and 19 also have side faces, including lingual faces 21 and buccal faces 22.

The smaller posterior teeth 18 are each provided with a single opening 23 in the occlusal face 20 adjacent the center thereof. A tunnel 24 extends from the occlusal opening 23 to an opening 25 in one of the side faces of the teeth, preferably the buccal face 22. The walls of each tunnel 24 preferably diverge from the occlusal opening 23 to the buccal opening 25. The larger posterior teeth 19 each have a pair of openings in the occlusal face 20 thereof adjacent the center thereof, which are connected by tunnels 24 to openings 25 in the buccal face 22. Here also the walls of the tunnels 24 preferably diverge from the occlusal openings 23 to the buccal openings 25. The single occlusal openings 23 in the smaller posterior teeth 18 are preferably of substantially the same size as each double occlusal opening 23 in the larger posterior teeth 19, and, likewise, the associated tunnels are also preferably of substantially the same size.

The openings 23 in the occlusal faces 20 of the posterior teeth 18 and 19 and the tunnels 24 extending therefrom form escape paths for food down through the occlusal surfaces 20 and out through the side or buccal surfaces 22 of the teeth. The occlusal surfaces 20 with their central openings 23 and their communicating tunnels 24 primarily cut the food in small particles according to the size of the occlusal openings as distinguished from crushing the food between the occluding faces of the upper and lower teeth. The fact that the teeth of this invention primarily cut the food instead of crushing the same requires less masticating pressure to obtain the desired end result of having the food in fine particles which are readily digestible and assimilated. Because of this smaller masticating pressure required trauma and abuse to the underlying supporting structures and tissues is minimized. Since the walls of the tunnels 24 diverge from the occlusal openings 23 to the buccal openings 25, food entering the occlusal openings 23 freely passes through the tunnels 24, the tunnels, therefore, being self-eliminating and cleaning. Because the tunnels 24 are also substantially straight and open directly into the occlusal and buccal faces 20 and 22, they may also be readily and simply brushed and cleaned. With the wearing or abrasion of the occlusal surfaces 20, no efficiency in cutting of the food is lost because as the occlusal faces 20 wear down, the same cutting edges about the occlusal openings 23 remain throughout the years and the escape tunnels 24 for the food remain intact and just as efficient as at the time of original insertion of the dentures. In fact, the efficiency of the teeth of this invention increases with wear because the abrasive action of the harder upper porcelain teeth 12 and 13 against the softer lower metal teeth 18 and 19 causes the latter to wear in exactly in accordance with the upper teeth and sharpens the cutting edges at the occlusal openings 23. This abrasive action of the harder upper porcelain teeth 12 and 13 on the softer lower metal teeth 18 and 19 causes the teeth 18 and 19 to wear in exactly in accordance with the upper teeth and, likewise, in accordance with the movements, pressure and excursions of the lower jaw, thereby eliminating any mechanical interference which would tend to dislodge the dentures. In other words, interference-free dentures are automatically produced by the wearer by natural abrasion of the lower teeth 18 and 19.

Thus, dentures constructed in accordance with this invention are readily and automatically aligned and balanced through use and wear for eliminating any mechanical interference which would tend to dislodge the dentures; their masticating efficiency and the pressures required for mastication are in no way lessened over periods of years of wear but, on the contrary, are in fact increased; they primarily cut food into small and easily digestible and assimilated particles rather than crushing the food, resulting in greatly decreased masticating pressures; they are substantially self-eliminating and cleaning; and they may be readily brushed and cleaned.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A nonanatomic posterior denture tooth having a substantially smooth occlusal face, at least one opening in the occlusal face adjacent the center thereof, and a substantially straight tunnel connecting said opening in the occlusal face with an opening in one of the side faces of the tooth, the walls of said tunnel uniformly diverging from the opening in the occlusal face to the opening in the side face of the tooth.

2. A nonanatomic posterior denture tooth having a substantially smooth occlusal face, at least one opening in the occlusal face adjacent the center thereof, and a substantially straight tunnel connecting said opening in the occlusal face with an opening in the buccal face only of the tooth.

3. A nonanatomic posterior denture tooth having a substantially smooth occlusal face, at least one opening in the occlusal face adjacent the center thereof, and a substantially straight tunnel connecting said opening in the occlusal face with an opening in the buccal face only of the tooth, the walls of said tunnel uniformly diverging from the opening in the occlusal face to the opening in the buccal face of the tooth.

4. A nonanatomic posterior tooth for a lower denture formed of metal and having a substantially smooth occlusal face for engaging a complementary occlusal face of a tooth in an upper denture and having at least one opening in the occlusal face adjacent the center thereof and a substantially straight tunnel connecting said opening in the occlusal face with an opening in the buccal face only of the tooth.

5. A nonanatomic posterior tooth for a lower denture formed of metal and having a substantially smooth occlusal face for engaging a complementary occlusal face of a tooth in an upper denture and having at least one opening in the occlusal face adjacent the center thereof and a substantially straight tunnel connecting said opening in the occlusal face with an opening in one of the side faces of the tooth, the walls of said tunnel uniformly diverging from the opening in the occlusal face to the opening in the side face of the tooth.

6. In combination, an upper denture having a plurality of posterior porcelain teeth, each having a substantially smooth occlusal surface, and a lower denture having a plurality of posterior metal teeth, each having a substantially smooth occlusal face complementary to and engaging the adjacent porcelain teeth of the upper denture, and each posterior metal tooth of the lower denture having at least one opening in the occlusal face adjacent the center thereof and a substantially straight tunnel connecting said opening in the occlusal face with an opening in the buccal face only of the metal tooth.

7. In combination, an upper denture having a plurality of posterior porcelain teeth, each having a substantially smooth occlusal surface, and a lower denture having a plurality of posterior metal teeth, each having a substantially smooth occlusal face complementary to and engaging the adjacent porcelain teeth of the upper denture, and each posterior metal tooth of the lower denture having at least one opening in the occlusal face adjacent the center thereof and a substantially straight tunnel connecting said opening in the occlusal face with an opening in one of the side faces of the tooth, the walls of each tunnel uniformly diverging from the opening in the occlusal face to the opening in the side face of the tooth.

IRVING L. COOK.

References Cited in the file of this patent

UNITED STATES PATENTS

| Number | Name | Date |
| --- | --- | --- |
| 1,822,837 | Avery et al. | Sept. 8, 1931 |
| 1,879,419 | Myerson et al. | Sept. 27, 1932 |
| 2,613,439 | Saffir | Oct. 14, 1952 |